United States Patent
Qing et al.

(10) Patent No.: US 8,112,650 B2
(45) Date of Patent: Feb. 7, 2012

(54) ADAPTIVE METHOD FOR SYSTEM RE-ACQUISITION IN POWER SAVING MODE OPERATION IN A MOBILE WIMAX SYSTEM

(75) Inventors: Shan Qing, San Diego, CA (US); Tom Chin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 698 days.

(21) Appl. No.: 12/211,876

(22) Filed: Sep. 17, 2008

(65) Prior Publication Data

US 2010/0070786 A1   Mar. 18, 2010

(51) Int. Cl.
*G06F 1/00* (2006.01)
*G06F 1/26* (2006.01)
*G06F 1/32* (2006.01)
*G08C 17/00* (2006.01)
*H04K 3/00* (2006.01)
*H04H 60/21* (2008.01)
*H04H 60/61* (2008.01)
*H04H 20/71* (2008.01)

(52) U.S. Cl. .......... 713/321; 455/1; 455/2.01; 455/3.01; 713/300; 713/320; 713/324; 370/311

(58) Field of Classification Search ............. 455/1, 2.01, 455/3.01, 3.04; 713/300, 310, 320, 323, 713/324, 340; 370/311

See application file for complete search history.

(56) References Cited

U.S. PATENT DOCUMENTS

| 6,889,055 | B1 * | 5/2005 | Neufeld | 455/458 |
| 2003/0144020 | A1 * | 7/2003 | Challa et al. | 455/522 |
| 2004/0043798 | A1 * | 3/2004 | Amerga et al. | 455/574 |
| 2008/0268844 | A1 * | 10/2008 | Ma et al. | 455/436 |

FOREIGN PATENT DOCUMENTS

| GB | 2409378 A | 6/2005 |
| WO | WO0207459 A2 | 1/2002 |
| WO | WO0233989 | 4/2002 |
| WO | WO2008136714 A1 | 11/2008 |

OTHER PUBLICATIONS

International Search Report—PCT/US2009/057059—International Search Authority, European Patent Office, Dec. 22, 2009.

* cited by examiner

*Primary Examiner* — Thomas Lee
*Assistant Examiner* — Samantha Hoang
(74) *Attorney, Agent, or Firm* — Milan Patel

(57) ABSTRACT

Methods and apparatus for re-acquiring a WiMAX network after a relatively long power saving mode (e.g., sleep or idle mode) using a "pre-wakeup" scheme are provided. According to this pre-wakeup scheme, a mobile station (MS) may power up receiving circuitry to search for the current channel or, if unsuccessful, a neighbor channel. After a successful network search during sleep mode, the MS may return to sleep for the remainder of the sleep window until the circuitry is powered up a second time to wakeup and then listen for an expected message. By pre-waking up and searching before waking up for the expected message, the MS may counteract the effects of the potential error in the local oscillator frequency accumulated during the long sleep mode. In this manner, the message miss rate may be reduced, thereby saving power and extending the time in which the MS may operate between battery rechargings.

44 Claims, 11 Drawing Sheets

ADAPTIVE METHOD FOR SYSTEM RE-ACQUISITION IN POWER SAVING MODE OPERATION IN A MOBILE WIMAX SYSTEM

TECHNICAL FIELD

Certain embodiments of the present disclosure generally relate to wireless communication and, more particularly, to recovering from a power saving mode by successfully re-acquiring a network on a current or neighbor channel.

BACKGROUND

OFDM and OFDMA wireless communication systems under the Institute of Electrical and Electronics Engineers (IEEE) 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MSs).

In an effort to conserve power at the MS, the IEEE 802.16 standard defines a sleep mode having different types of power saving class (PSC), where the MS may power down one or more components during sleep windows. The MS may periodically wake up to monitor for activity (e.g., a traffic indication message or other PSC active state termination message) during listening windows to determine whether the sleep mode should be exited. However, the MS generally powers up components during the listening window, thereby consuming battery power. Furthermore, a missed message may prompt the MS to search on neighbor channels or wait for the next message while at a full power state, thereby also consuming power.

SUMMARY

Certain embodiments of the present disclosure generally relate to using a "pre-wakeup" operation when attempting to re-acquire the network after a relatively long sleep or idle duration in an effort to negate the effects of the potential timing error accumulated during power saving mode operation.

Certain embodiments of the present disclosure provide a method for re-acquisition of a wireless communications network by a mobile station in a power saving mode having one or more low power intervals when at least some receiving circuitry is powered down. The method generally includes temporarily powering up the receiving circuitry to locate a channel during a low power interval of the power saving mode during which at least some of the receiving circuitry is powered down; powering down the receiving circuitry for a remainder of the low power interval after the channel is located; and, at an end of the low power interval, powering up the receiving circuitry to listen for a signal prompting an exit from the power saving mode.

Certain embodiments of the present disclosure provide a computer-program product for re-acquisition of a wireless communications network by a mobile station in a power saving mode. The computer-program product typically comprises a computer-readable medium having instructions stored thereon, the instructions being executable by one or more processors. The instructions generally include instructions for temporarily powering up, during a low power interval of the power saving mode during which at least some receiving circuitry is powered down, the receiving circuitry to locate a channel; instructions for powering down the receiving circuitry for a remainder of the low power interval after the channel is located; and instructions for powering up the receiving circuitry at an end of the low power interval to listen for a signal prompting an exit from the power saving mode.

Certain embodiments of the present disclosure provide an apparatus for wireless communications capable of re-acquiring a network when in a power saving mode. The apparatus generally includes means for temporarily powering up, during a low power interval of the power saving mode during which at least some receiving circuitry is powered down, the receiving circuitry to locate a channel; means for powering down the receiving circuitry for a remainder of the low power interval after the channel is located; and means for powering up the receiving circuitry at an end of the low power interval to listen for a signal prompting an exit from the power saving mode.

Certain embodiments of the present disclosure provide a mobile device. The mobile device generally includes receiving circuitry powered down during a low power interval of a power saving mode and power saving logic configured to temporarily power up the receiving circuitry to locate a channel, power down the receiving circuitry for a remainder of the low power interval after the channel is located, and, power up the receiving circuitry at an end of the low power interval to listen for a signal prompting an exit from the power saving mode.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
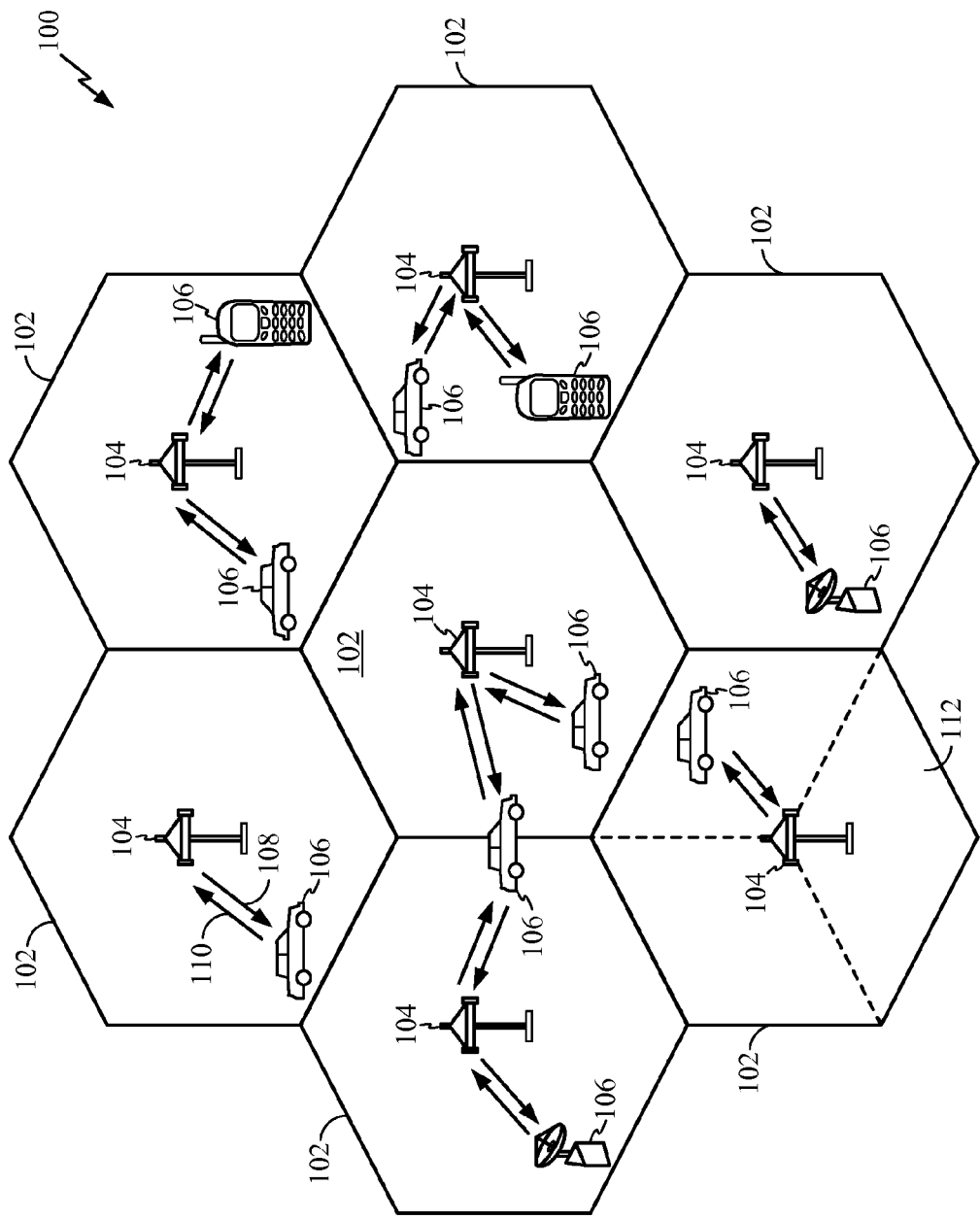
FIG. 1 illustrates an example wireless communication system, in accordance with certain embodiments of the present disclosure.

Certain embodiments of the present disclosure provide techniques and apparatus for re-acquiring a WiMAX network after a relatively long power saving mode, such as sleep mode or idle mode, using a "pre-wakeup" scheme. According to this pre-wakeup scheme, a mobile station (MS) may power up receiving circuitry to search for the current channel or, if unsuccessful, a neighbor channel. After a successful network search during sleep mode, for example, the MS may return to sleep for the remainder of the sleep window until the circuitry is powered up a second time to wakeup and then listen for an expected message. By pre-waking up and searching before the circuitry wakes up for the expected message, the MS may negate the effects of the potential error in the local oscillator frequency accumulated during the long sleep mode. In this manner, the message miss rate may be reduced, thereby saving power and extending the time in which the MS may operate between cycles of battery charging.

Exemplary Wireless Communication System

The methods and apparatus of the present disclosure may be utilized in a broadband wireless communication system. As used herein, the term "broadband wireless" generally refers to technology that may provide any combination of wireless services, such as voice, Internet and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is because OFDM/OFDMA modulation schemes can provide many advantages such as modulation efficiency, spectrum efficiency, flexibility and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
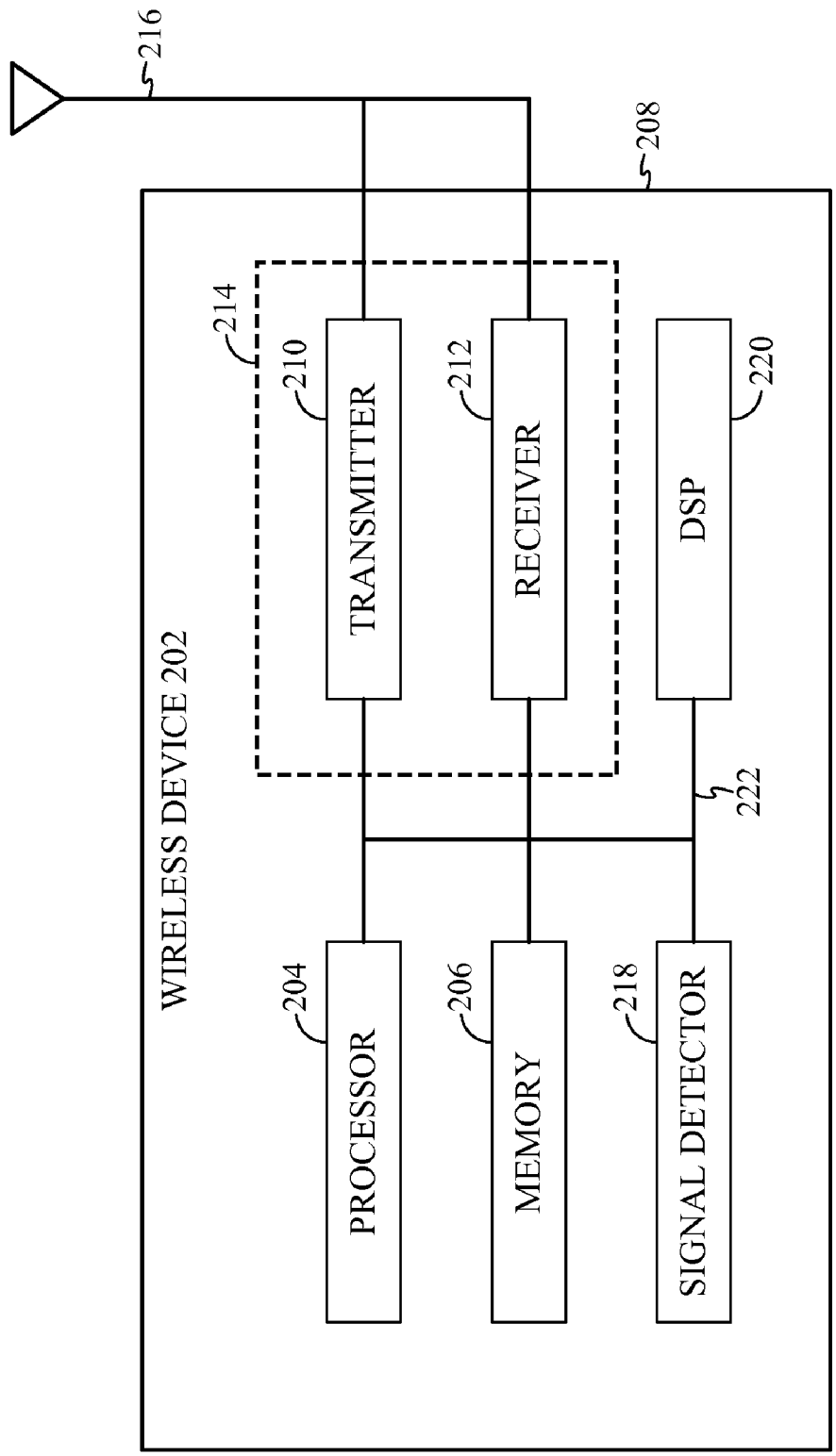
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per subcarrier and per symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
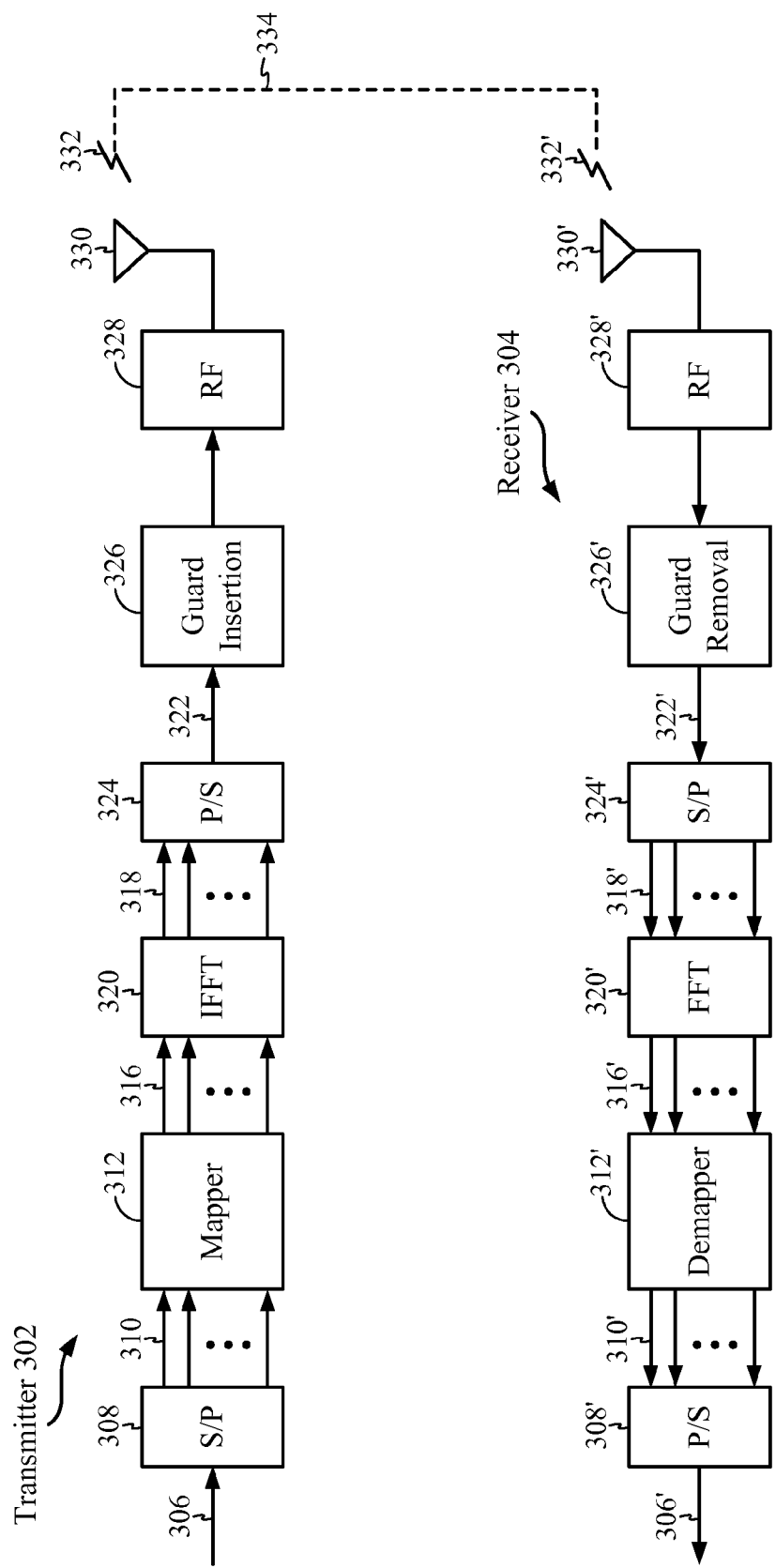
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary WiMAX System Re-Acquisition after Sleep Mode

Figure 4A:
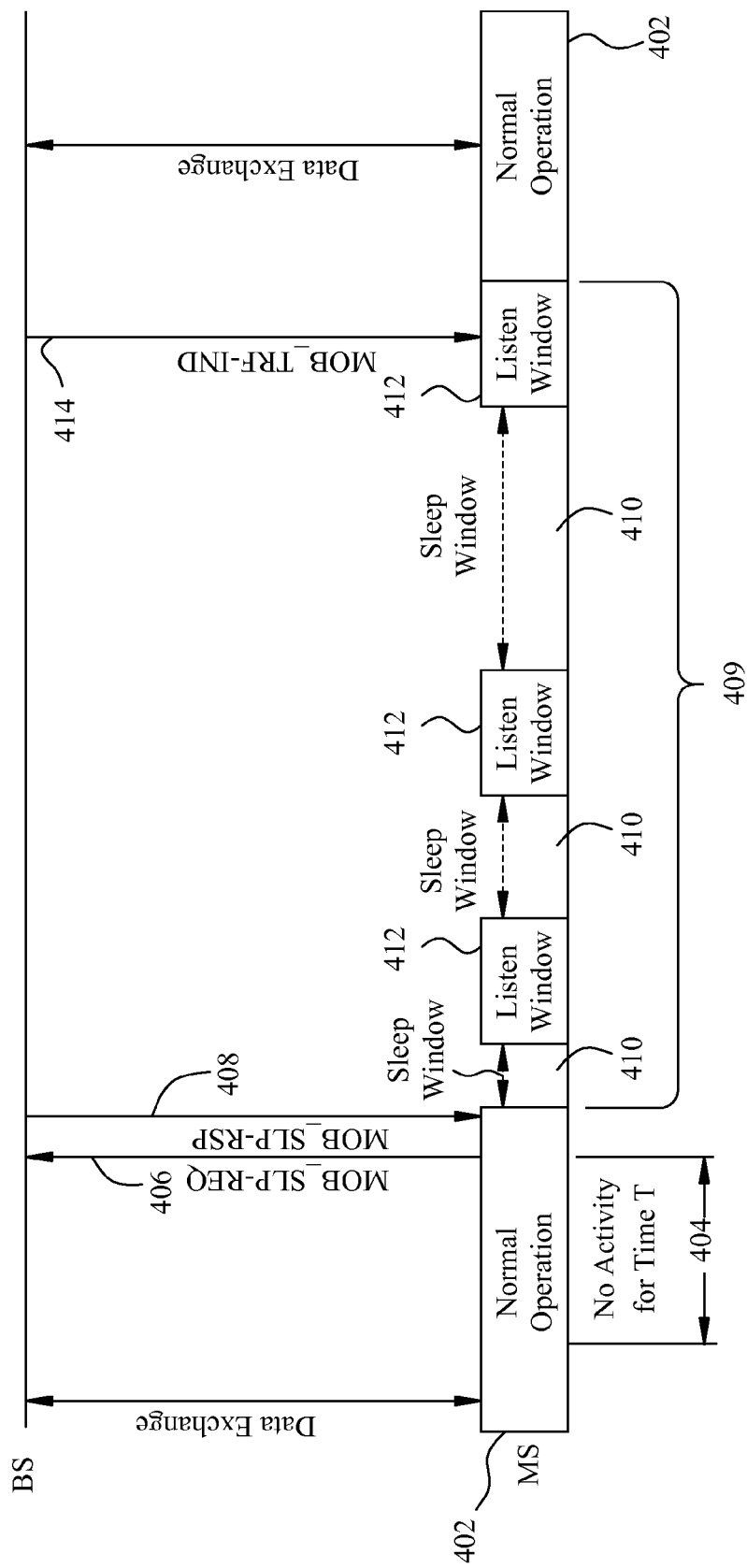
FIG. 4A illustrates example exchanges between a base station (BS) and a mobile station (MS) to initiate and terminate a sleep mode, in accordance with certain embodiments of the present disclosure.

FIG. 4A illustrates example exchanges that may occur between a base station (BS) and a mobile station (MS) entering and recovering from a Power Saving Class (PSC) of type I sleep mode. The exchanges are similar for PSCs of type II and type III, and the differences are noted below. The exchanges may begin with a period of "normal operation" 402. During normal operation 402, data may be exchanged between the BS and the MS.

At some point during normal operation 402, data may stop being exchanged due to data being currently unavailable for the MS, such as when a call or a data session is terminated. After a period (T) of inactivity 404, the MS may automatically activate one or more of the PSC types in an effort to conserve power. As illustrated, to activate a PSC type, the MS may send a Sleep Request message (MOB_SLP-REQ) 406 to the BS. Upon receiving a Sleep Response message (MOB_SLP-RSP) 408 from the BS, the MS may enter into a sleep mode 409. The format of the MOB_SLP-REQ and MOB_SLP-RSP messages 406, 408 may be in accordance with the IEEE 802.16 family of standards. For other embodiments, the MS may activate a PSC type by transmitting TLVs (Type/Length/Value encodings) in a Ranging Request (RNG-REQ) message.

The MS may begin the sleep mode 409 by entering the first of one or more low power intervals (e.g., sleep windows 410), which may have a fixed or exponentially increasing duration, depending on the activated PSC type. As illustrated, between sleep windows 410, the MS may temporarily awaken during a listening interval (e.g., listening windows 412) by powering up at least some of its receiving and decoding circuitry (e.g., the RF front end 328', the demapper 312', and the processor 204) in an effort to "listen" for activity that might prompt an exit (deactivation) of the power saving mode and a return to normal operation.

For example, PSC of type I has exponentially increasing sleep windows 410 (at least up to the final value specified in the MOB_SLP-REQ or RNG-RSP messages) interleaved by listening windows 412 of fixed duration, as shown in FIG. 4A. PSC of type II has multiple fixed-duration sleep windows interleaved by listening windows, also of fixed duration, although the durations of the sleep windows and the listening windows may be different. PSC of type III only has a single sleep window, after which the PSC automatically becomes inactive. PSC of type III need not use a listening window.

In the example illustrated in FIG. 4A, a PSC active state termination message, such as a traffic indication message (MOB_TRF-IND) 414 indicating data activity, is detected in a listening window 412. The format of the MOB_TRF-IND message 414 may be in accordance with the IEEE 802.16 family of standards. In response, the MS may terminate the active state of the PSC sleep mode, return to normal operation 402, and resume data exchanges with the BS. For PSC of type I, the BS sends the MOB_TRF-IND message 414 with a positive traffic indication to alert the MS of the appearance of DL traffic demand. For PSC of type II, the active state continues until explicit termination by MOB_SLP-REQ/MOB_SLP-RSP messages or TLVs transmitted in RNG-REQ and RNG-RSP messages, for example. As described above, PSC of type III automatically becomes inactive after the expiration of the single sleep window.

Exemplary WiMAX System Re-Acquisition after Idle Mode

Figure 4B:
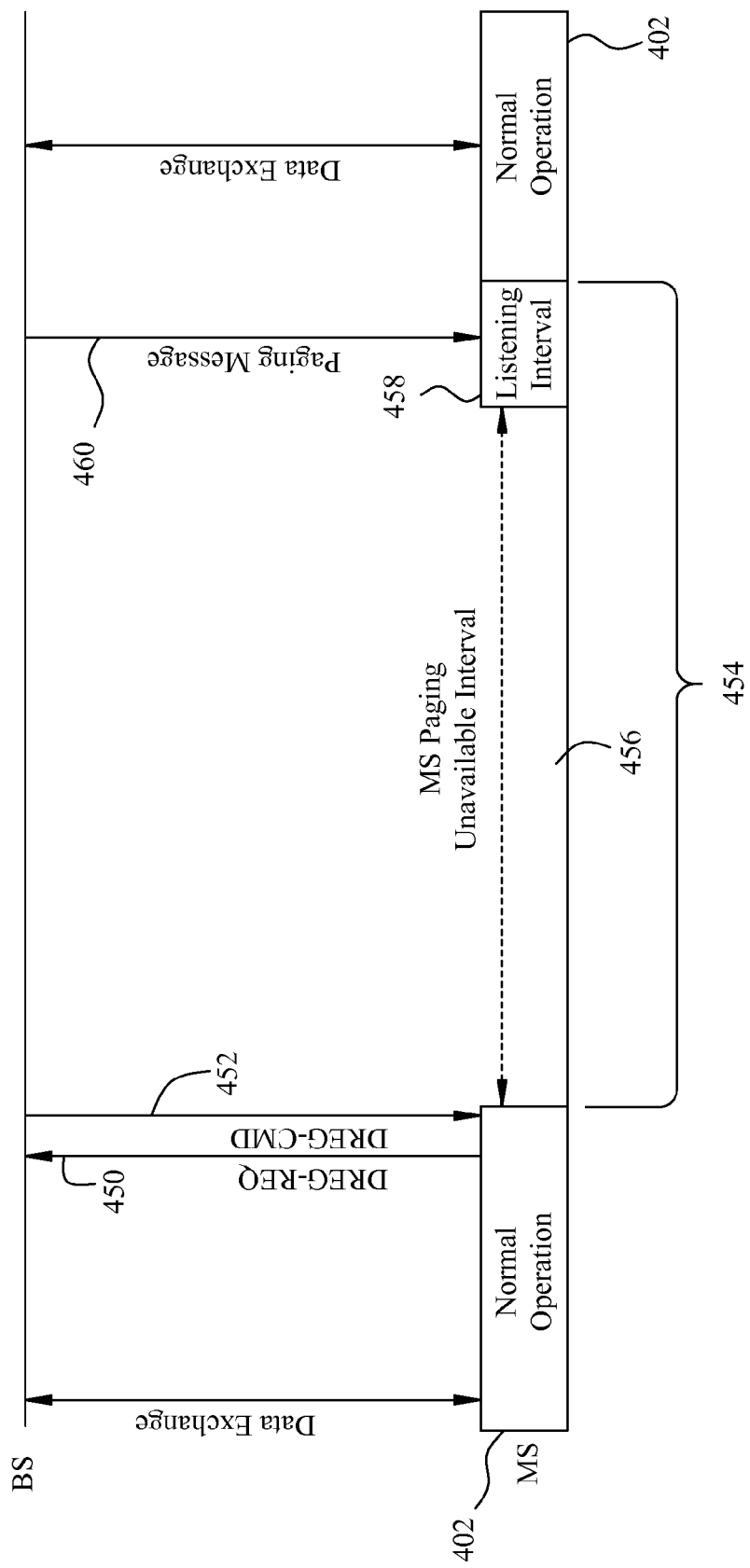
FIG. 4B illustrates example exchanges between a BS and an MS to initiate and terminate an idle mode, in accordance with certain embodiments of the present disclosure.

FIG. 4B illustrates example exchanges between a BS and an MS to initiate and terminate an idle mode. The exchanges may begin with normal operation 402, during which data may be exchanged between the BS and the MS.

At some point during normal operation 402, data may stop being exchanged, and the MS may become essentially inactive. In an effort to conserve power and operational resources, the MS may send a De-Registration Request message (DREG-REQ) 450 to the BS. Upon receiving a De-Registration Command message (DREG-CMD) 452 from the BS, the MS may enter into idle mode 454. Idle mode 454 may allow the MS to become periodically available for DL broadcast traffic messaging without registration at a specific BS as the MS traverses an air link environment populated by multiple BSs, typically over a large geographic area. Idle mode 454 may benefit the MS by removing the active requirements for handover and all requirements for normal operation 402. Instead, the MS may be restricted in idle mode 454 to scanning at discrete intervals.

At initiation of the idle mode 454, the MS may engage in cell selection to obtain a new preferred BS. The preferred BS is a neighbor BS evaluated and selected by the MS as having the best air interface DL properties. The preferred BS may be the MS's previous serving BS, as illustrated in the exchanges of FIG. 4B.

Once the preferred BS has been determined, the MS may determine the time until the next regular BS paging interval for the preferred BS. The calculated time until the next regular BS paging interval, less any MS DL scanning, decoding, and synchronization time requirements, may be the MS Paging Unavailable Interval 456. During the MS Paging Unavailable Interval 456, the MS may power down, scan neighbor BSs, reselect a preferred BS, conduct ranging, or perform other activities for which the MS will not guarantee availability to any BS for DL traffic.

During an MS Paging Listening Interval 458, the MS may synchronize on the DL for the preferred BS in time for the MS to begin decoding any BS broadcast paging message 460. The BS broadcast paging message 460 may indicate the presence of DL traffic pending for the MS or may poll the MS and request a location update without requiring a full network entry. At the end of the MS Paging Listening Interval 458, the MS may elect to terminate the idle mode 454 and return to normal operation 402 as illustrated in FIG. 4B, or the MS may decide to enter another MS Paging Unavailable Interval.

As used herein, the term "power saving mode" may include sleep mode, idle mode, or any other mode where one or more components may be powered down. While embodiments related to sleep mode are described below in detail, embodiments of the present disclosure may apply to any power saving mode. Analogies may be drawn between the low power states of sleep mode (i.e., sleep windows) and idle mode (i.e., MS Paging Unavailable Interval), between the listening intervals of sleep mode (i.e., listen windows) and idle mode (i.e., MS Paging Listening Intervals), and between the messages prompting an exit from the power saving mode in sleep mode (e.g., a MOB_TRF-IND message) and idle mode (i.e., a BS broadcast paging message).

Exemplary Re-Acquisition after Sleep Mode Utilizing Pre-Wakeup

Figure 5:
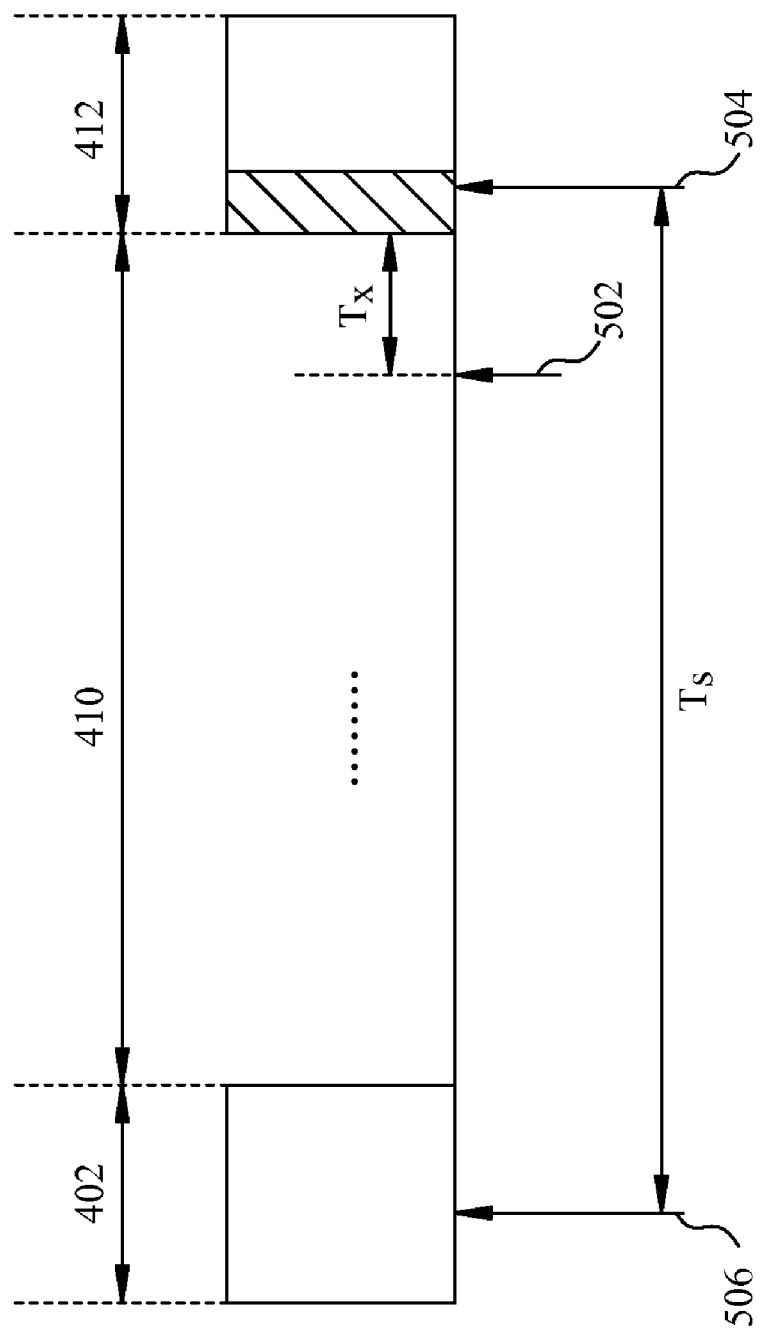
FIG. 5 illustrates an example sleep mode timing diagram for a MS, in accordance with certain embodiments of the present disclosure.

FIG. 5 illustrates an example sleep mode timing diagram for a MS. The time the MS spends in the sleep mode, or the sleep duration lasting $T_s$ seconds, may begin at 506, after a period of inactivity 404 during normal operation 402. The accuracy of the MS local oscillator, which may be used to track system time during RF sleep, may depend on the sleep duration. The MS local oscillator frequency error with respect to the network frequency may be estimated. The estimation may only be valid for $T_z$ seconds after being made. For a sleep duration less than $T_z$ seconds ("short" sleep), the timing information provided by the local oscillator may be assumed to be accurate enough for a successful network re-acquisition and message decoding. The MS may take approximately $T_x$ seconds to prepare the RF and other receiving circuitry to be ready for receiving and decoding a signal prompting an exit from the power saving mode, such as a MOB_TRF-IND message 414, at 504.

For a sleep duration $T_s$ greater than $T_z$ seconds (i.e., "long" sleep), there is an increased chance that a PSC active state termination message (e.g., a MOB_TRF-IND message 414 or a MOB_SLP-RSP) will be missed because the estimation of the local oscillator frequency error may no longer be valid, so the timing information may not be accurate enough for a successful network re-acquisition and message decoding. This contradicts the goal of minimizing power consumption because if network searching on the current channel fails at 504, the MS may have to scan neighboring RF channels or wait for the next page at a full power state.

Figure 6:
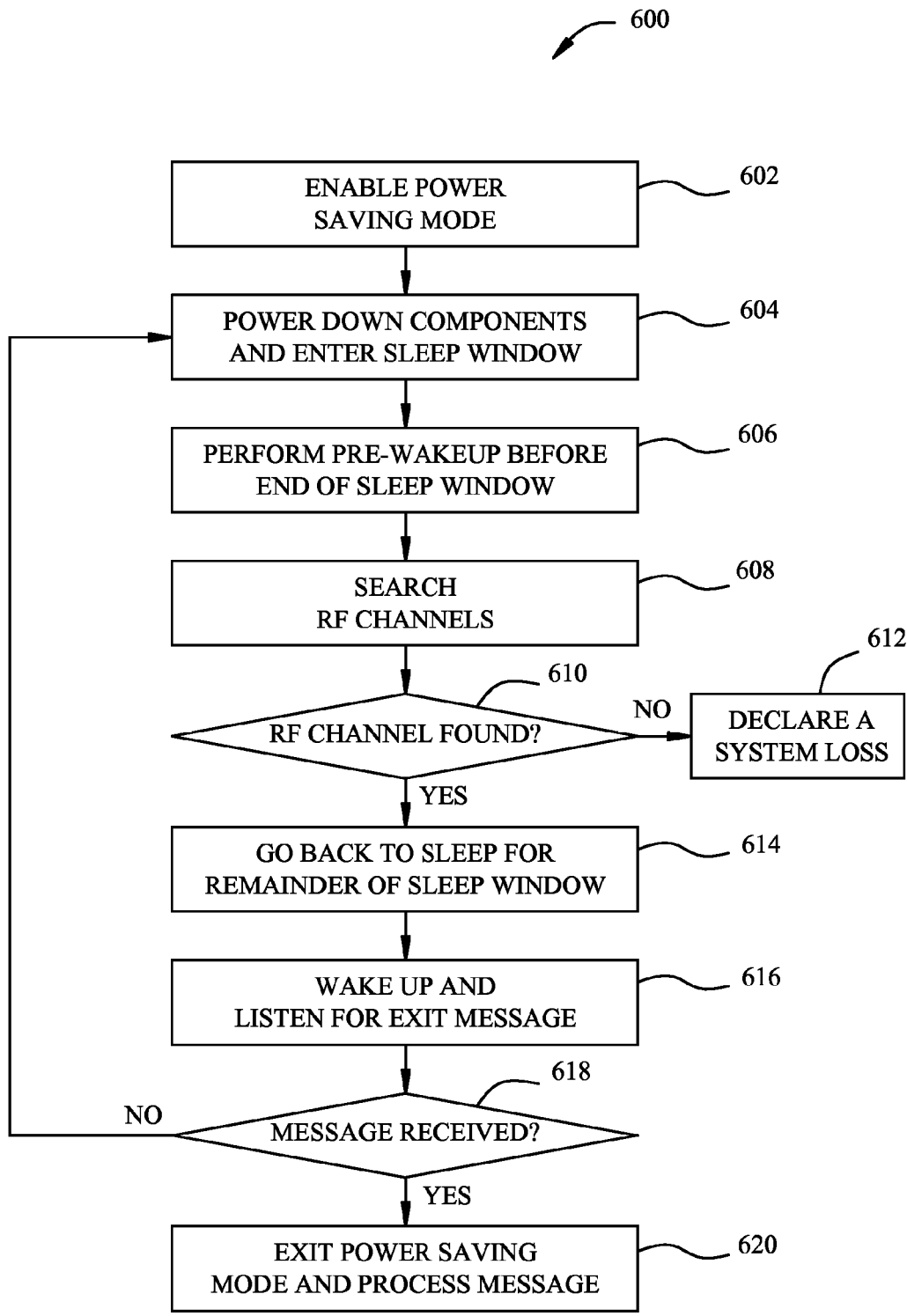
FIG. 6 illustrates a flow diagram of example operations for entering and recovering from sleep mode using a pre-wakeup period, in accordance with certain embodiments of the present disclosure.

FIG. 6 illustrates example operations 600 for entering and recovering from sleep mode using a "pre-wakeup" period while in a low power state, in accordance with embodiments of the present disclosure, thus significantly reducing the message miss rate and, hence, MS power consumption. The operations 600 begin, at 602, by enabling a power saving mode, such as a sleep mode. At 604, after receiving a sleep response message 408 from the serving BS, for example, the MS may power down components and enter a sleep window 410.

In an effort to decrease the chances of missing a PSC active state termination message for sleep durations greater than $T_z$ seconds, the MS may wake up twice before a time period during which such a message is expected. The first wakeup, at 606, is called pre-wakeup. The MS may use a pre-wakeup operation to correct any potential timing error accumulated during the RF sleep mode operation. The length between pre-wakeup and the expected message may take into account the number of different neighbor RF channels (broadcasted by the network periodically in the neighbor advertisement message, or MOB_NBR-ADV) and the average time $T_y$, it may take to detect a WiMAX network on a given RF channel.

At 608, network searching may begin on the current RF channel. As used herein, the current channel may generally be defined as the channel from the serving base station that the MS was exchanging data with before the MS entered the sleep mode. Although the receiving and decoding circuitry may be powered on during pre-wakeup, transmitting circuitry (e.g., the power amplifier) need not be powered on during pre-wakeup operations, allowing the MS to run in a low power state, thereby decreasing power consumption. For some embodiments, the clock frequency and/or the sampling rate of the receiving circuitry may also be decreased while in pre-wakeup, compared to the rate during normal WiMAX data exchange, in an effort to reduce MS battery power consumption.

Figure 7A:
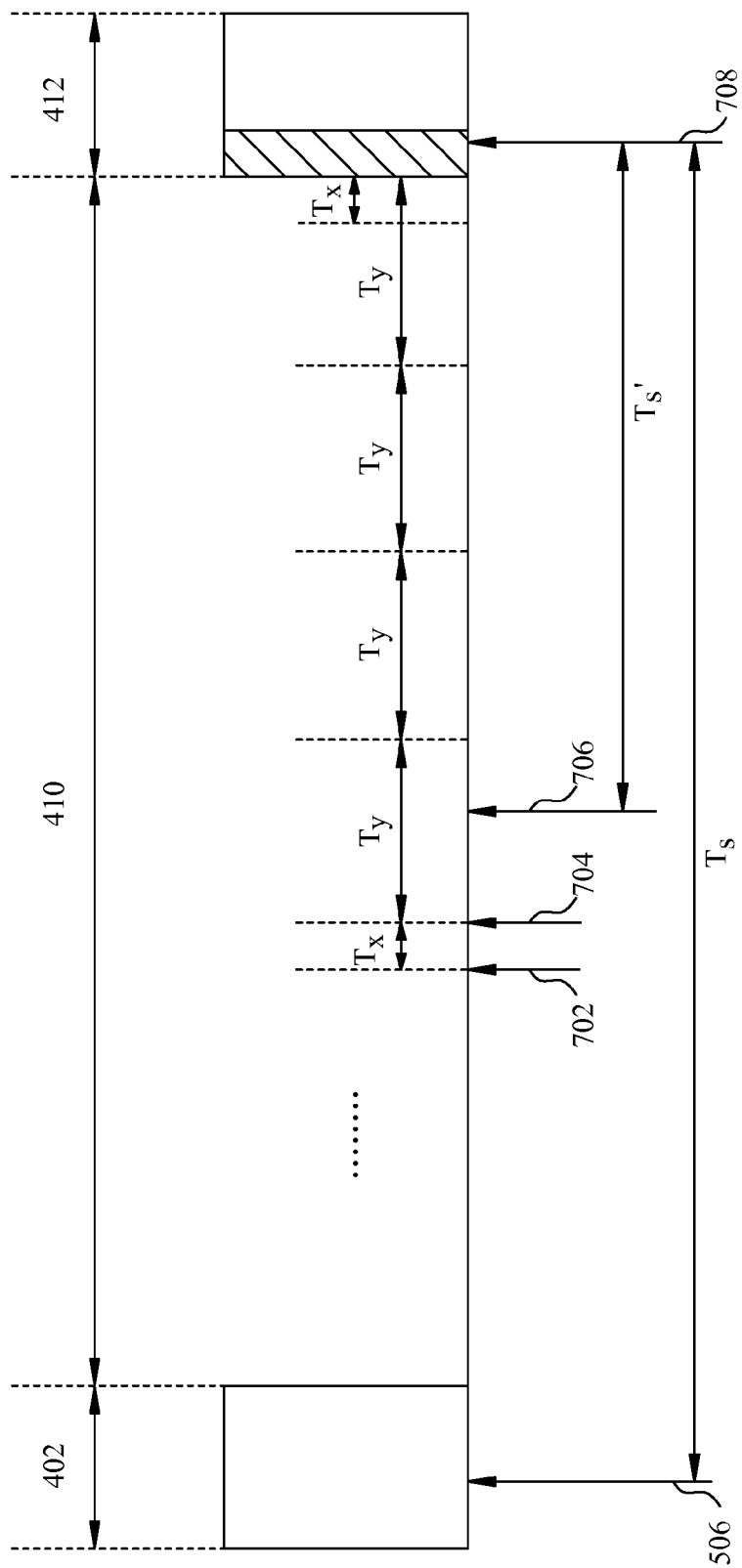
FIGS. 7A-C illustrate example sleep mode timing diagrams for a MS with a pre-wakeup period, in accordance with certain embodiments of the present disclosure.

FIG. 7A illustrates an example sleep mode timing diagram for a MS, where network searching on the current RF channel is successful. It takes about $T_x$ seconds after the pre-wakeup is initiated at 702 for RF "warm-up," before network searching begins at 704 on the current channel. It takes on average about $T_y$ seconds to detect a usable WiMAX network on a given RF channel. The duration of $T_y$ may be dependent on the channel quality and/or the algorithm in the MS for detecting a BS using the pilot signals of the preamble. For example, $T_y$ may have an average value of 100 ms. Therefore, if N is the number of RF channels in a mobile station's neighbor list, the start of the pre-wakeup at 702 may be scheduled approximately $T_x + T_y*(N+1)$ seconds before a listening window 412 during which a message prompting an exit from the power saving mode may be expected. Because network searching on the current RF channel was successful at 610, 706, as illustrated in FIG. 7A, the MS may go back to sleep for the remainder of the sleep window 410, at 614, with a remaining sleep duration $T_s'$.

Figure 7B:
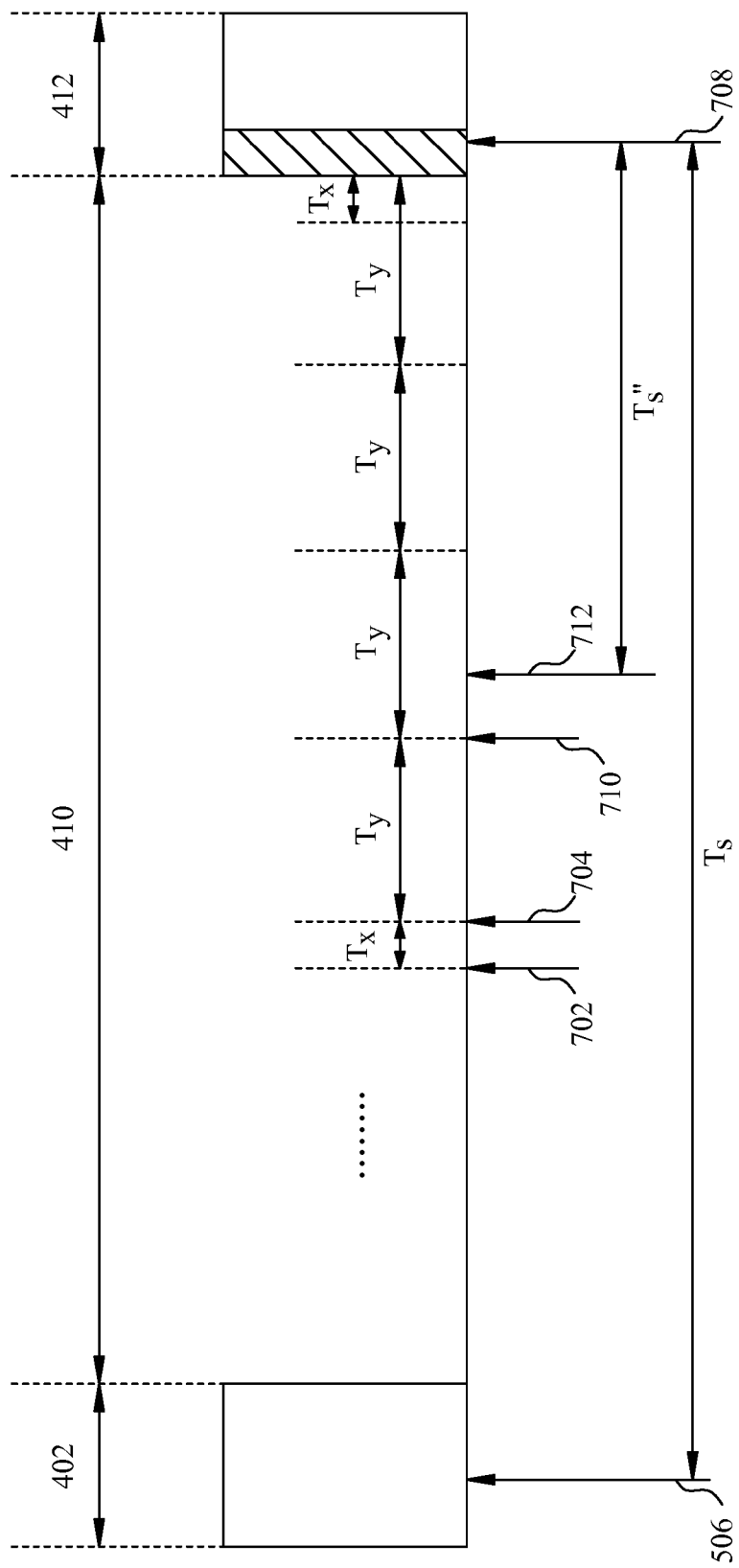

At 608, if network searching on the current channel fails, the MS may start searching neighbor channels, as illustrated in FIG. 7B. Because network searching on the current channel failed at 710, the MS may start searching the first neighbor channel. If network searching on the first neighbor channel fails, the MS may search the next neighbor channel until finding a neighbor network. In FIG. 7B, a neighbor network is found at 712 on the first neighbor channel, so the MS now may go back to sleep, at 614, with a remaining sleep duration $T_s''$ shorter than the sleep duration $T_s'$ in FIG. 7A.

Figure 7C:
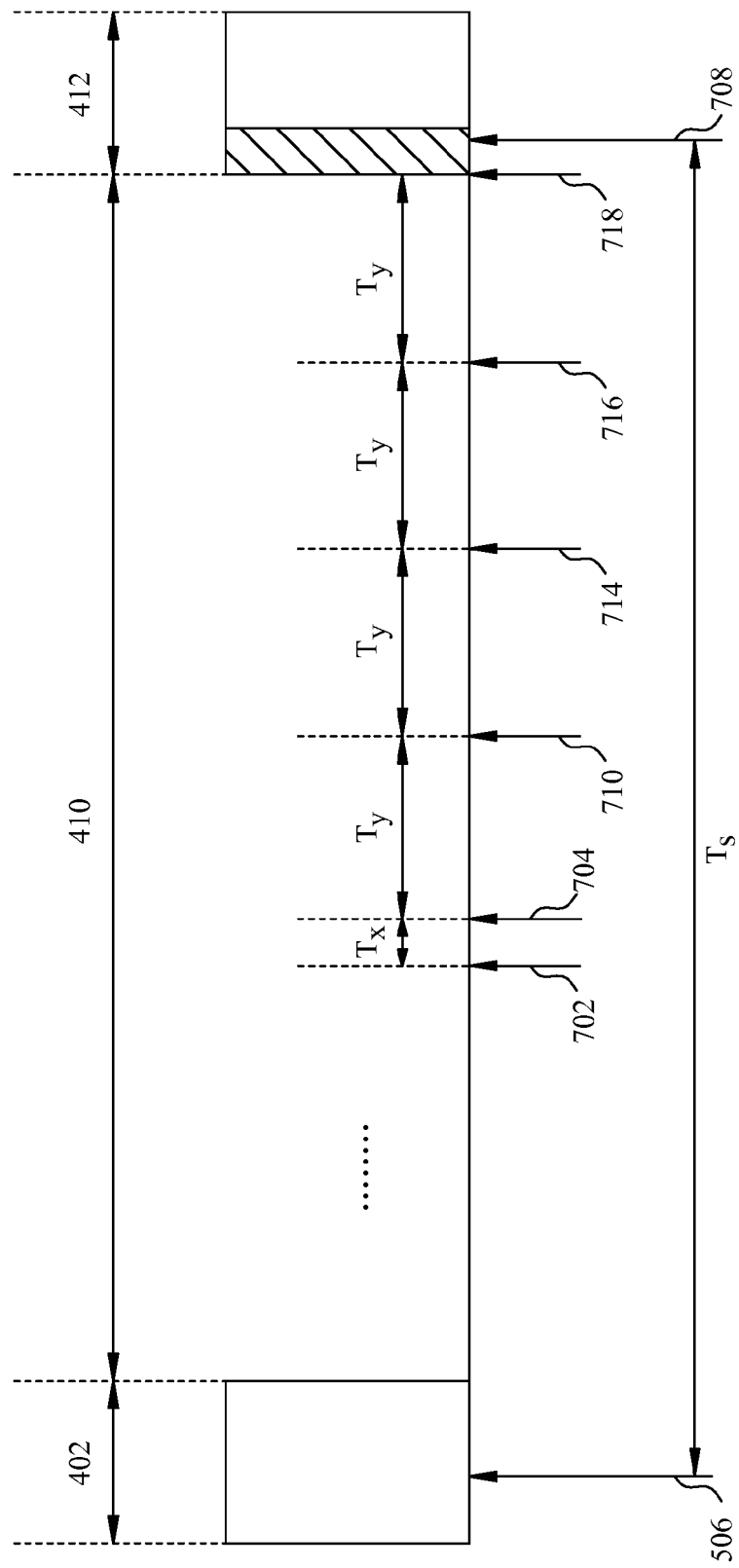

At 608, it is also possible that after pre-waking up from power saving mode, the MS may already be out of network coverage, for example, and may not be able to find any channel in its neighbor list at 610. In such instances, the MS may eventually declare a system loss at 612. As illustrated in FIG. 7C, after network searching on the first neighbor channel fails at 714, the MS may start searching on the second neighbor channel. After network searching on the second neighbor channel fails at 716, the MS may start searching on the third neighbor channel. The MS may declare a system loss at 718 after failing to re-acquire on the current channel or any neighbor channel before the expected message at 708.

At 616, if the MS is successful to re-acquire on the current channel or a neighbor channel, the MS may wake up a second time, approximately $T_x$ seconds before an interval for receiving the expected message at 708, to prepare the RF and other receiving circuitry to be ready for receiving and decoding a message prompting an exit from the power saving mode (refer to FIGS. 7A and 7B).

At 618, if a PSC active state termination message (e.g., MOB_TRF-IND message 414) is received during a listening window 412, the MS may exit the power saving mode and process the message at 620. However, if a termination message is not received at 618, the MS may power down components, at 604, and enter another sleep window 410 for some embodiments.

Exemplary Re-Acquisition Using Pre-Wakeup

For relatively long power saving modes, a pre-wakeup period may be initiated to aid an MS in re-acquiring on the current channel or a neighbor channel while in a low power state despite any potential inaccuracy of the local oscillator. By negating the effects of any local oscillator error, use of the pre-wakeup may reduce the exit message miss rate, thereby decreasing power consumption, in turn.

Figure 6A:
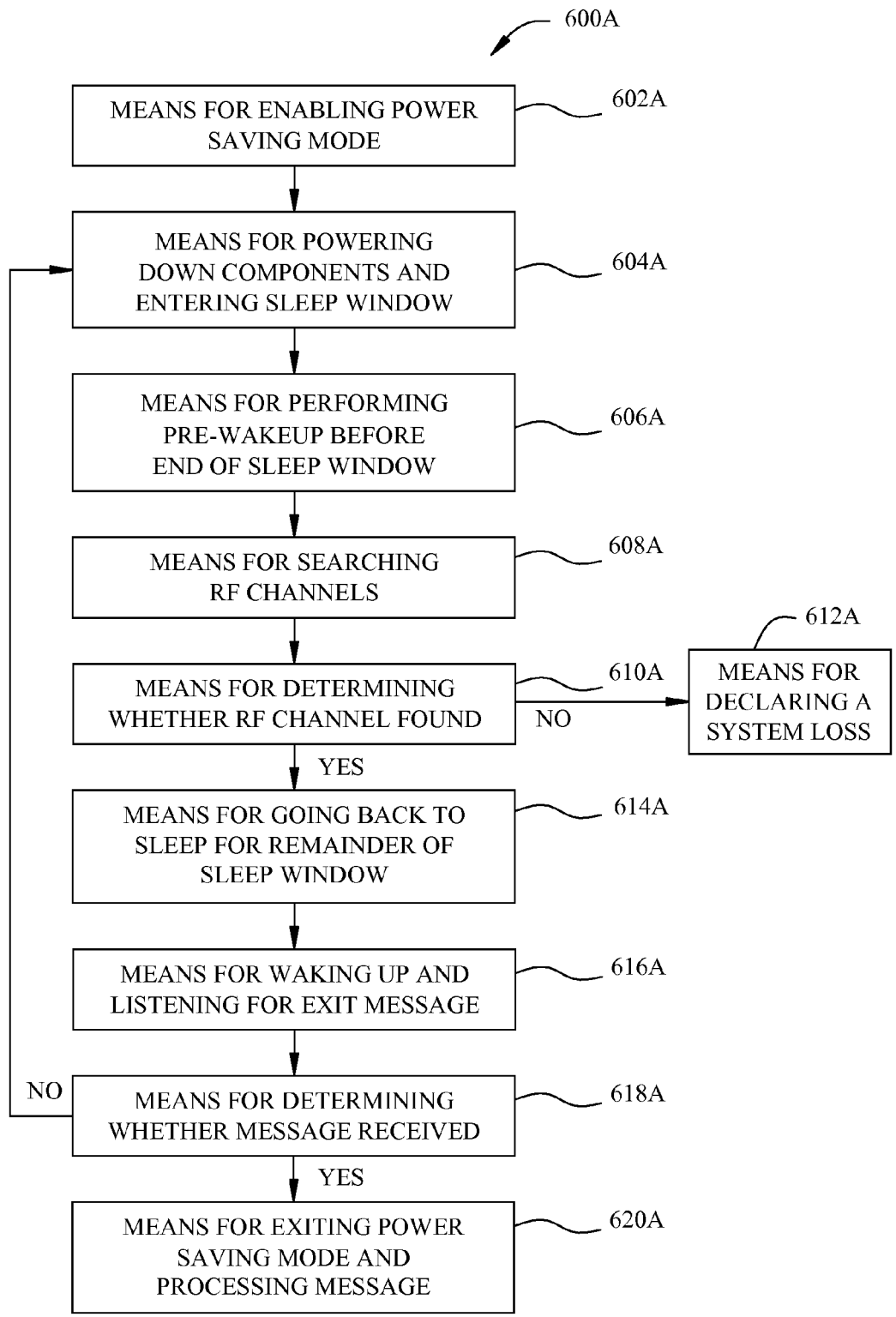
FIG. 6A is a block diagram of means corresponding to the example operations of FIG. 6 for entering and recovering from sleep mode, in accordance with certain embodiments of the present disclosure.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 602-620 illustrated in FIG. 6 correspond to means-plus-function blocks 602A-620A illustrated in FIG. 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for re-acquisition of a wireless communications network by a mobile station in a power saving mode, comprising:

during a low power interval from a plurality of low power intervals of the power saving mode during which at least some receiving circuitry is powered down, temporarily powering up the receiving circuitry to locate a channel wherein the plurality of low power intervals includes at least a first low power interval with a first length and a second low power interval with a second length longer than the first length;

powering down the receiving circuitry for a remainder of the low power interval after the channel is located; and at an end of the low power interval, powering up the receiving circuitry for one or more listening intervals of the power saving mode to listen for a signal prompting an exit from the power saving mode, wherein the one or more listening intervals interleave the plurality of low power intervals.

2. The method of claim 1, wherein the power saving mode comprises a sleep mode and the low power interval comprises a sleep window.

3. The method of claim 1, wherein the low power intervals are exponentially increasing with time.

4. The method of claim 1, further comprising locating the channel.

5. The method of claim 4, wherein locating the channel comprises:

searching for a current channel; and searching for a neighbor channel if the current channel is not found.

6. The method of claim 5, wherein temporarily powering up the receiving circuitry takes about $T_x$ seconds, wherein searching for the current channel or the neighbor channel takes on average about $T_y$ seconds, wherein N is a number of different neighbor channels in a neighbor list maintained by the mobile station, and wherein temporarily powering up the receiving circuitry is initiated approximately $T_x+T_y*(N+1)$ seconds before the exit signal is expected.

7. The method of claim 1, further comprising declaring a system loss if the channel is not located.

8. The method of claim 4, wherein locating the channel comprises negating effects of a potential timing error in a local oscillator frequency accumulated during the power saving mode.

9. The method of claim 1, wherein the power saving mode comprises an idle mode and the low power interval comprises a Mobile Station (MS) Paging Unavailable Interval.

10. The method of claim 9, wherein the signal prompting the exit from the power saving mode is a paging message having a format in accordance with one or more standards of the Institute of Electrical and Electronics Engineers (IEEE) 802.16 family of standards.

11. The method of claim 1, wherein the signal prompting the exit from the power saving mode is a traffic indication (MOB_TRF-IND) message having a format in accordance with one or more standards of the Institute of Electrical and Electronics Engineers (IEEE) 802.16 family of standards.

12. A computer-program product for re-acquisition of a wireless communications network by a mobile station in a power saving mode, comprising a non-transitory computer readable medium having instructions stored thereon, the instructions being executable by one or more processors and the instructions comprising:

instructions for temporarily powering up, during a low power interval from a plurality of low power intervals of the power saving mode during which at least some receiving circuitry is powered down, the receiving circuitry to locate a channel wherein the plurality of low power intervals includes at least a first low power interval with a first length and a second low power interval with a second length longer than the first length;

instructions for powering down the receiving circuitry for a remainder of the low power interval after the channel is located; and instructions for powering up the receiving circuitry at an end of the low power interval for one or more listening intervals of the power saving mode to listen for a signal prompting an exit from the power saving mode, wherein the one or more listening intervals interleave the plurality of low power intervals.

13. The computer-program product of claim 12, wherein the power saving mode comprises a sleep mode and the low power interval comprises a sleep window.

14. The computer-program product of claim 12, wherein the low power are exponentially increasing with time.

15. The computer-program product of claim 12, further comprising instructions for locating the channel.

16. The computer-program product of claim 15, wherein the instructions for locating the channel comprise:

instructions for searching for a current channel; and
instructions for searching for a neighbor channel if the current channel is not found.

17. The computer-program product of claim 16, wherein temporarily powering up the receiving circuitry takes about $T_x$ seconds, wherein searching for the current channel or the neighbor channel takes on average about $T_y$ seconds, wherein N is a number of different neighbor channels in a neighbor list maintained by the mobile station, and wherein temporarily powering up the receiving circuitry is initiated approximately $T_x+T_y*(N+1)$ seconds before the exit signal is expected.

18. The computer-program product of claim 12, further comprising instructions for declaring a system loss if the channel is not located.

19. The computer-program product of claim 15, wherein the instructions for locating the channel comprise instructions for negating effects of a potential timing error in a local oscillator frequency accumulated during the power saving mode.

20. The computer-program product of claim 12, wherein the power saving mode comprises an idle mode and the low power interval comprises a Mobile Station (MS) Paging Unavailable Interval.

21. The computer-program product of claim 20, wherein the signal prompting the exit from the power saving mode is a paging message having a format in accordance with one or more standards of the Institute of Electrical and Electronics Engineers (IEEE) 802.16 family of standards.

22. The computer-program product of claim 12, wherein the signal prompting the exit from the power saving mode is a traffic indication (MOB_TRF-IND) message having a format in accordance with one or more standards of the Institute of Electrical and Electronics Engineers (IEEE) 802.16 family of standards.

23. An apparatus for wireless communications capable of re-acquiring a network when in a power saving mode, comprising: means for temporarily powering up, during a low power interval from a plurality of low power intervals of the power saving mode during which at least some receiving circuitry is powered down, the receiving circuitry to locate a channel wherein the plurality of low power intervals includes at least a first low power interval with a first length and a second low power interval with a second length longer than the first length; means for powering down the receiving circuitry for a remainder of the low power interval after the channel is located; and means for powering up the receiving circuitry at an end of the low power interval for one or more listening intervals of the power saving mode to listen for a signal prompting an exit from the power saving mode, wherein the one or more listening intervals interleave the plurality of low power intervals.

24. The apparatus of claim 23, wherein the power saving mode comprises a sleep mode and the low power interval comprises a sleep window.

25. The apparatus of claim 23, wherein the low power intervals are exponentially increasing with time.

26. The apparatus of claim 23, further comprising means for locating the channel.

27. The apparatus of claim 26, wherein the means for locating the channel comprise:

means for searching for a current channel; and
means for searching for a neighbor channel if the current channel is not found.

28. The apparatus of claim 27, wherein temporarily powering up the receiving circuitry takes about $T_x$ seconds, wherein searching for the current channel or the neighbor channel takes on average about $T_y$ seconds, wherein N is a number of different neighbor channels in a neighbor list maintained by the apparatus, and wherein the means for temporarily powering up the receiving circuitry is configured to initiate powering up the receiving circuitry approximately $T_x+T_y*(N+1)$ seconds before the exit signal is expected.

29. The apparatus of claim 23, further comprising means for declaring a system loss if the channel is not located.

30. The apparatus of claim 26, wherein the means for locating the channel comprise means for negating effects of a potential timing error in a local oscillator frequency accumulated during the power saving mode.

31. The apparatus of claim 23, wherein the power saving mode comprises an idle mode and the low power interval comprises a Mobile Station (MS) Paging Unavailable Interval.

32. The apparatus of claim 31, wherein the signal prompting the exit from the power saving mode is a paging message having a format in accordance with one or more standards of the Institute of Electrical and Electronics Engineers (IEEE) 802.16 family of standards.

33. The apparatus of claim 23, wherein the signal prompting the exit from the power saving mode is a traffic indication (MOB_TRF-IND) message having a format in accordance with one or more standards of the Institute of Electrical and Electronics Engineers (IEEE) 802.16 family of standards.

34. A mobile device, comprising:

receiving circuitry powered down during a low power interval from a plurality of low power intervals of a power saving mode, wherein the plurality of low power intervals includes at least a first low power interval with a first length and a second low power interval with a second length longer than the first length; and power saving logic configured to temporarily power up the receiving circuitry to locate a channel, power down the receiving circuitry for a remainder of the low power interval after the channel is located, and, power up the receiving circuitry for one or more listening intervals of the power saving mode at an end of the low power interval to listen for a signal prompting an exit from the power saving mode, wherein the one or more listening intervals interleave the plurality of low power intervals.

35. The mobile device of claim 34, wherein the power saving mode comprises a sleep mode and the low power interval comprises a sleep window.

36. The mobile device of claim 34, wherein the low power intervals are exponentially increasing with time.

37. The mobile device of claim 34, further comprising logic for locating the channel.

38. The mobile device of claim 37, wherein the logic for locating the channel is configured to search for a current channel and, if the current channel is not found, to search for a neighbor channel.

39. The mobile device of claim 35, wherein temporarily powering up the receiving circuitry takes about $T_x$ seconds, wherein searching for the current channel or the neighbor channel takes on average about $T_y$ seconds, wherein N is a number of different neighbor channels in a neighbor list maintained by the mobile device, and wherein the power saving logic is configured to temporarily power up the receiving circuitry approximately $T_x+T_y*(N+1)$ seconds before the exit signal is expected.

40. The mobile device of claim 34, further comprising logic for declaring a system loss if the channel is not located.

41. The mobile device of claim 37, wherein the logic for locating the channel is configured to negate effects of a potential timing error in a local oscillator frequency accumulated during the power saving mode.

42. The mobile device of claim 34, wherein the power saving mode comprises an idle mode and the low power interval comprises a Mobile Station (MS) Paging Unavailable Interval.

43. The mobile device of claim 42, wherein the signal prompting the exit from the power saving mode is a paging message having a format in accordance with one or more standards of the Institute of Electrical and Electronics Engineers (IEEE) 802.16 family of standards.

44. The mobile device of claim 34, wherein the signal prompting the exit from the power saving mode is a traffic indication (MOB_TRF-IND) message having a format in accordance with one or more standards of the Institute of Electrical and Electronics Engineers (IEEE) 802.16 family of standards.

* * * * *